E. L. PACKARD.
Frying Pan.
No. 108,385.
Patented Oct. 18, 1870.
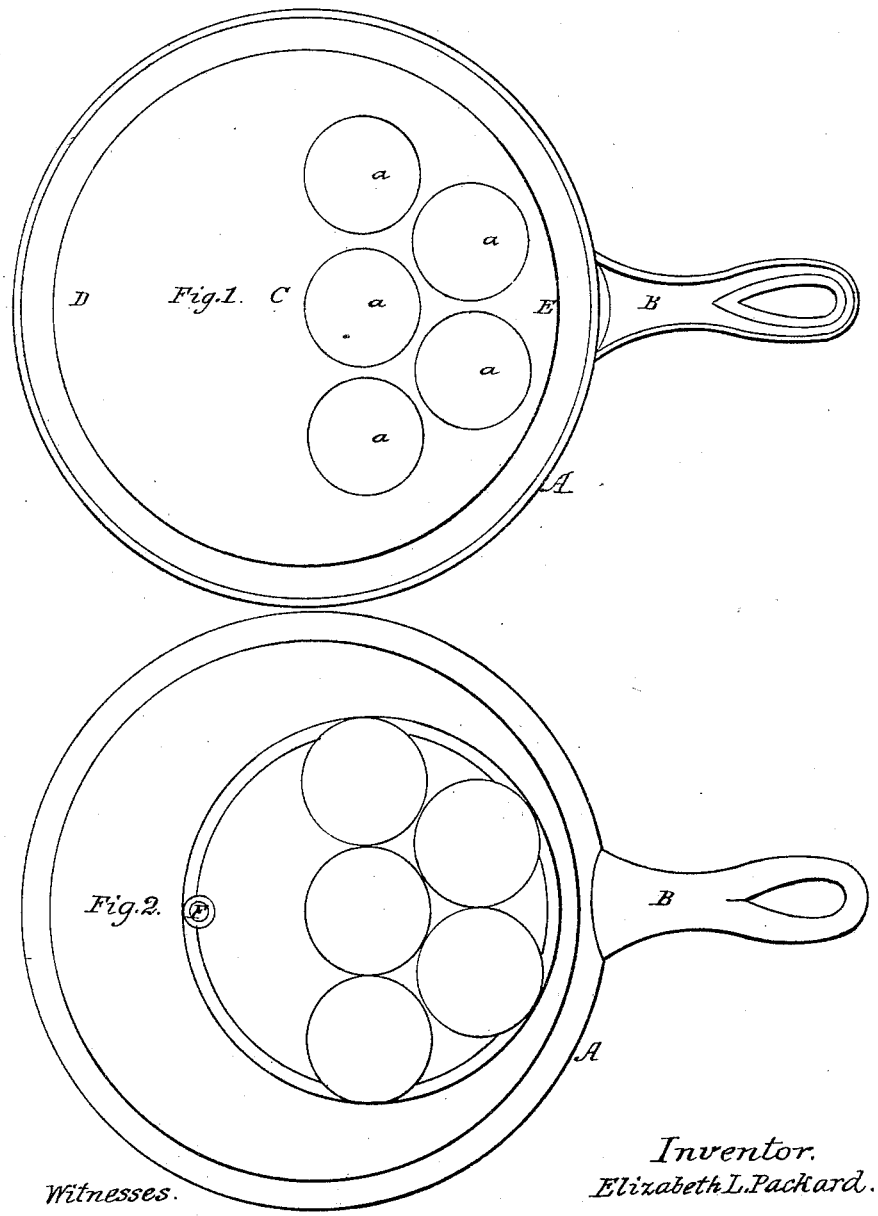
Witnesses.
C. E. Rand.
Geo. Poole.
Inventor.
Elizabeth L. Packard.
by her Attorney
F. P. Hale.

United States Patent Office.

ELIZABETH L. PACKARD, OF STOUGHTON, ASSIGNOR TO LUCIUS H. PACKARD, OF BOSTON, MASSACHUSETTS.

Letters Patent No. 108,385, dated October 18, 1870.

IMPROVEMENT IN COOKING UTENSILS.

The Schedule referred to in these Letters Patent and making part of the same

*To all persons to whom these presents may come:*

Be it known that I, ELIZABETH L. PACKARD, of Stoughton, in the county of Norfolk and State of Massachusetts, have invented a "new and useful or improved Cooking Utensil;" and do hereby declare the same to be fully described in the following specification, and represented in the accompanying drawing, in which—

Figure 1 denotes a top view, and

Figure 2 a bottom view of the device, as constructed in accordance with my invention.

My invention has reference to that class of culinary devices termed "frying-pans," it being especially designed for cooking or frying ham and eggs.

The main object of my invention is to provide a means by which the yolk and albuminous portion of an egg, while undergoing the process of being fried, shall not only be more evenly and better cooked, but retain their integrity as well as their peculiar flavor and richness, than is the case when manipulated and fried in the ordinary manner.

It is a fact well-known that, in the common process of frying eggs, the shells of the eggs are first broken and the liquid or semi-fluid contents thereof are poured into the pan, (whose bottom is one continuous plane surface,) which often breaks the albumen and causes it to become widely and unevenly diffused over its bottom, whereby the outer portions thereof become so dessicated or burned, before the other parts are cooked, as to lose their distinctive character and become insipid or tastelesss. My invention obviates this evil.

In the said drawing—

A denotes a circular, shallow metallic dish or pan, provided with a handle, B, projecting therefrom.

C denotes the inner surface or bottom of the pan, the front portion, D, thereof, or that part opposite the handle, is plane or level, and is intended for frying ham, meat, fish, &c., while the remaining part, or that marked E, is provided with a series of cups or semi-spherical chambers, *a a*, &c., whose bottoms extend through and project from the under surface of the pan, as shown in fig. 2.

F is a projection or leg, which extends down from the under surface of the pan, and serves, with the convex portions of the cups, to maintain the pan in a horizontal plane, when the pan is removed from the fire and placed upon a table, or other flat surface.

This pan, when in use, is intended to be placed in or over one of the boiler-openings of a stove or range, and may be made of any desirable size or capacity.

From the above it will be seen that I am enabled to cook or fry both ham, meat, or fish and eggs, at the same time, my peculiar construction of the pan, viz., with the series of egg-receiving cups or chambers, enabling me to more evenly and better cook the eggs, so as not only to preserve their entirety and their peculiar flavor, but render them far more palatable than when fried in the ordinary way. Besides, the cups imparting their peculiar shapes to the eggs while being cooked renders their appearance far more inviting when placed upon the table.

I do not claim a frying-pan as made with its bottom an entire plane surface, nor do I claim a frying-pan designed wholly for frying eggs, and having its entire bottom formed with a series of egg-receiving cups, as I am aware that neither of such is new, and neither of them will attain the result sought by my invention.

What I claim is—

The combined ham and egg-frier, constructed as described, viz., with its bottom formed with the plane portion D, and the portion E thereof provided with the series of chambers *a a*, &c, the whole being as described and shown, and for the purposes set forth.

ELIZABETH L. PACKARD.

Witnesses:
C. BLODGETT, Jr.,
L. H. PACKARD.